US009122926B2

(12) United States Patent
Venkatesha et al.

(10) Patent No.: US 9,122,926 B2
(45) Date of Patent: Sep. 1, 2015

(54) IRIS RECOGNITION USING LOCALIZED ZERNIKE MOMENTS

(75) Inventors: Sharath Venkatesha, Golden Valley, MN (US); Saad J. Bedros, West St. Paul, MN (US); Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 416 days.

(21) Appl. No.: 13/552,694

(22) Filed: Jul. 19, 2012

(65) Prior Publication Data

US 2014/0023240 A1   Jan. 23, 2014

(51) Int. Cl.
G06K 9/00 (2006.01)
(52) U.S. Cl.
CPC .......... *G06K 9/0061* (2013.01); *G06K 9/00617* (2013.01)
(58) Field of Classification Search
None
See application file for complete search history.

(56) References Cited

U.S. PATENT DOCUMENTS

| | | | |
|---|---|---|---|
| 6,247,813 B1 * | 6/2001 | Kim et al. ............ | 351/206 |
| 6,273,566 B1 | 8/2001 | Kobayashi et al. | |
| 6,525,883 B2 | 2/2003 | Hirohara et al. | |
| 6,536,900 B2 | 3/2003 | Mihashi et al. | |
| 6,540,692 B2 | 4/2003 | Mihashi et al. | |
| 6,685,320 B2 | 2/2004 | Hirohara et al. | |
| 6,802,609 B2 | 10/2004 | Mihashi et al. | |
| 6,941,015 B1 * | 9/2005 | Kim et al. ............ | 382/190 |
| 7,146,983 B1 | 12/2006 | Hohla et al. | |
| 7,216,980 B2 | 5/2007 | Mihashi et al. | |
| 7,249,852 B2 | 7/2007 | Mihashi et al. | |
| RE39,882 E | 10/2007 | Mihashi et al. | |
| 7,309,126 B2 | 12/2007 | Mihashi et al. | |
| 7,311,402 B2 | 12/2007 | Mihashi et al. | |
| 7,331,674 B2 | 2/2008 | Dai | |
| 7,490,939 B2 | 2/2009 | Hirohara et al. | |
| 7,500,754 B2 | 3/2009 | Yamaguchi et al. | |
| 7,527,379 B2 | 5/2009 | Yamaguchi et al. | |
| 7,530,692 B2 | 5/2009 | Yamaguchi et al. | |
| 7,537,340 B2 | 5/2009 | Yamaguchi et al. | |
| 7,635,186 B2 | 12/2009 | Kobayashi et al. | |
| 7,677,728 B2 | 3/2010 | Hirohara et al. | |

(Continued)

OTHER PUBLICATIONS

G.S. Badrinath et al. "Verification system robust to occlusion using low-order Zernike moments of palmprint sub-images." Telecommun Syst (2011) 47:275-290. Published online May 2010.*

(Continued)

*Primary Examiner* — Vu Le
*Assistant Examiner* — Samah Beg
(74) *Attorney, Agent, or Firm* — Schwegman Lundberg & Woessner, P.A.

(57) ABSTRACT

A system receives an iris image and segments the iris region. The segmented iris region is mapped to a unit disk and partitioned into local iris regions (or sectors) as a function of the radius and angle The system calculates localized Zernike moments for a plurality of regions of the unit disk. The localized Zernike moment includes a projection of the local iris region into a space of Zernike polynomial orthogonal basis functions. The system generates an iris feature set from the localized Zernike moments for each partitioned region, excluding the regions which are comprised by occlusion. The iris features are weighted based on the conditions of blur, gaze and occlusion of the iris region. A probe iris image is then matched to a plurality of iris images in a database based on the distance of its feature set to the corresponding plurality of iris feature sets.

18 Claims, 5 Drawing Sheets

(56) References Cited

U.S. PATENT DOCUMENTS

| | | | |
|---|---|---|---|
| 7,677,731 B2 | 3/2010 | Mihashi et al. | |
| 7,717,562 B2 | 5/2010 | Dai | |
| 7,748,848 B2 | 7/2010 | Dai | |
| 7,887,187 B2 | 2/2011 | Dai | |
| 8,483,450 B1* | 7/2013 | Derakhshani et al. | 382/117 |
| 2006/0147094 A1* | 7/2006 | Yoo | 382/117 |
| 2007/0036397 A1* | 2/2007 | Hamza | 382/117 |
| 2009/0027618 A1* | 1/2009 | Perner | 351/206 |
| 2009/0252382 A1* | 10/2009 | Liu et al. | 382/117 |
| 2010/0142765 A1* | 6/2010 | Hamza | 382/117 |
| 2010/0239119 A1* | 9/2010 | Bazakos et al. | 382/103 |
| 2010/0316263 A1* | 12/2010 | Hamza | 382/117 |
| 2011/0150334 A1* | 6/2011 | Du et al. | 382/173 |
| 2012/0207357 A1* | 8/2012 | Bedros et al. | 382/117 |
| 2013/0259322 A1* | 10/2013 | Lin et al. | 382/117 |
| 2014/0044319 A1* | 2/2014 | Derakhshani et al. | 382/117 |

OTHER PUBLICATIONS

A. Ross et al. "Matching Highly Non-ideal Ocular Images: An Information Fusion Approach," 2012 IEEE, 5th IAPR International Conference on Biometrics (ICB), Mar. 29-Apr. 1, 2012, pp. 446-453.*

Tajbakhsh et al. "Robust Iris Verification Based on Local and Global Variations," EURASIP Journal on Advances in Signal Processing, 2010, pp. 1-13.*

Vatsa et al. "Improving Iris Recognition Performance Using Segmentation, Quality Enhancement, Match Score Fusion, and Indexing," IEEE Transactions on Systems, Man, and Cybernetics—Part B: Cybernetics, vol. 38, No. 4, Aug. 2008, pp. 1021-1035.*

He et al. "Efficient Iris Spoof Detection via Boosted Local Binary Patterns", 2009, p. 1080-1090.*

Sim et al. "Translation, Scale, and Rotation Invariant Texture Descriptor for Texture-based Image Retrieval", IEEE 2000, p. 742-745.*

Mukundan, R., et al., "A Comparative Analysis of Radial-Tchebichef Moments and Zernike Moments", *BMVC-2009*, (London, Sep. 8-10, 2009), (2009), 1-7.

Reyes-Lopez, J., et al., "Zernike's feature descriptors for Iris Recognition with SVM", *XXX International Conference of the Chilean Computer Science Society (SCCC 2011)*, [online] Retrieved from the Internet: <URL: http://jcc2011.utalca.cl/actas/SCCC/jcc2011_submission_108.pdf>, (2011), 6 pgs.

* cited by examiner

IRIS RECOGNITION USING LOCALIZED ZERNIKE MOMENTS

TECHNICAL FIELD

The present disclosure relates to a system and method for iris recognition, and in an embodiment, but not by way of limitation, a system and method for iris recognition using localized Zernike moments.

BACKGROUND

Many iris recognition algorithms are in use, with Daugman's algorithm based on 2D Gabor Wavelets and the Standoff Iris Recognition algorithm (SIRM, Honeywell, Inc.) being well known. These current algorithms are designed to achieve the best performance on high quality irises. However, the algorithms do not perform as well using degraded irises. The degradations, normally in the form of blur, gaze and occlusion, severely limit the recognition capabilities of the current algorithms. Current algorithms follow a common theme that segment and convert the circular iris doughnut region to a rectangular region using a polar transformation. This transformation, acting as a simplification process, leads to loss of information. This in particular is important when the iris is subjected to degradation such as blur, gaze, and occlusion. Moreover, since current iris acquisition systems have the capability to acquire iris images from distances up to 20 meters, there is significant degradation to the quality of the captured irises at these distances.

DETAILED DESCRIPTION

Figure 1:
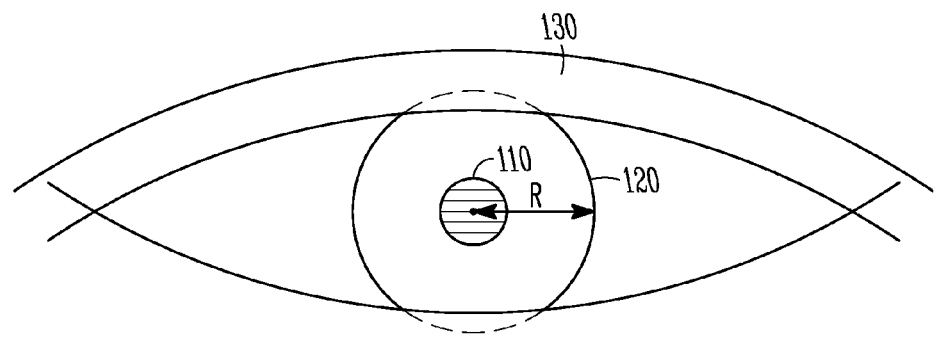
FIG. 1 illustrates the boundaries of an iris and a pupil.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment of the present disclosure is a novel feature extraction that extends the application of iris recognition to non-ideal conditions and can loosen the constraints of iris acquisition, while keeping the performance of the recognition high. Specifically, the embodiment is a feature extraction for non-ideal iris recognition using extended Zernike moments. The method achieves good performance on irises captured from a distance and exploits the application of localized Zernike moments for iris recognition under ideal and non-ideal conditions.

Zernike Polynomials are a sequence of polynomials that are orthogonal on a unit disk. They are well known and widely used in the analysis of optical systems. They are also widely used in image analysis as shape descriptors. The kernel of Zernike moments is a set of orthogonal Zernike polynomials defined over the polar coordinate space inside a unit circle. Zernike moments are robust to image noise and minor variations in shape. As noted above, the iris degradations involve both noise introduction (blur) and shape variation (occlusion and gaze). An important property exploited by the method is the robustness of Zernike moments to image noise and minor variations in shape.

The lower order polynomials approximate the global features of the shape and the higher order terms capture the local shape. This approach exploits local texture features from the different moments. Then, localized moving windows are applied on the output of Zernike moments to obtain a spectrogram for each moment, similar to the application of short time Fourier transform (STFT) in speech recognition that exploit the localization of signatures. The use of the localized moving windows results in an ignoring of the effects of the occlusion of the irises by the eyelids. Another embodiment considers Zernike moments separately for each sector of the disk and uses only the sector with visible iris information. This embodiment results in an iris feature set $Z_{iris}$ for every iris considered and an iris template is generated.

For classification, two approaches are considered. One is to use a standard variance based discrimination using rank order procedure of selecting discriminative features that have small intra-class variance and large inter-class separation. The second approach is based on a minimum distance classification. The distance between two iris features can be determined using the Euclidean distance or the city block distance measure.

The embodiments can be implemented on virtually any computer system, including a desktop computer. Iris images captured from an iris acquisition system serve as the input. The system should have a large dataset of iris images that are already processed using the algorithm and saved as iris templates. The system detects and segments the iris region and computes the iris template based on localized Zernike moments. This template is then matched to the set of saved templates to determine a score and further classify it as a match/non-match. The system can be sufficiently improved for performance using a graphical processing unit (GPU). The system can also be implemented on an onboard processing device such as a digital signal processor or on similar architectures.

Figure 2:
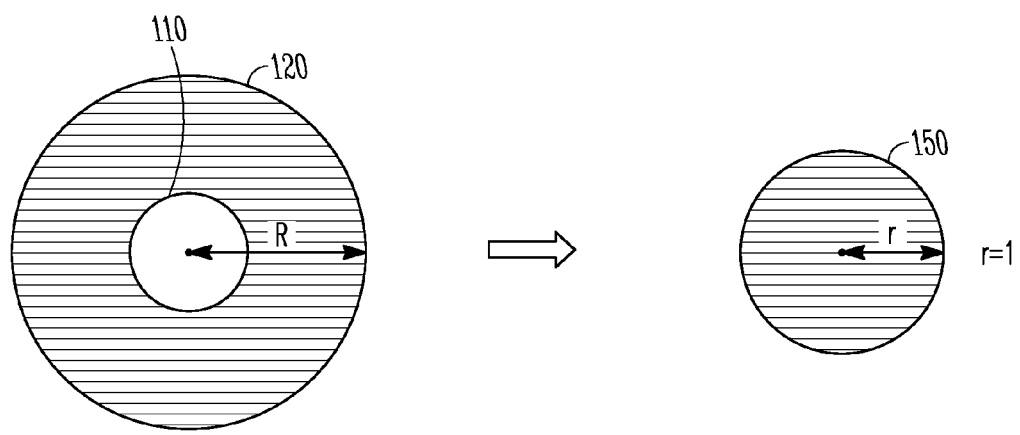
FIG. 2 illustrates a mapping of an iris to a unit circle.

In an embodiment, the pupil and iris are segmented as the first step. FIG. 1 illustrates the boundaries of a typical pupil 110, iris 120, and eyelid 130. The pupil 110 and iris 120 have a radius R. To calculate the Zernike moments, the iris region is mapped to a unit disc using polar coordinates, where the center of the iris/pupil is the center of the unit disc. FIG. 2 illustrates this, wherein the iris region 110 with radius R of FIG. 2 are mapped to the unit circle 150. The mapping of the iris region starts from the inner boundary of the iris to the outer boundary of the iris region.

Figure 4A:
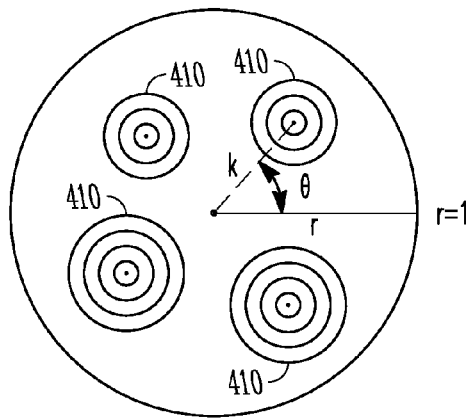
FIG. 4A illustrates a full iris mapped to a unit circle with Guassian filters.
Figure 4B:
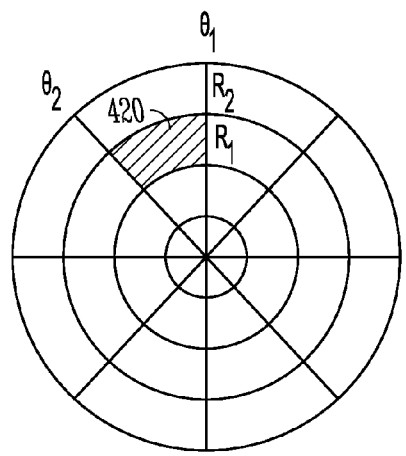
FIG. 4B is an example embodiment of a unit disk that can be used in connection with an embodiment of the present disclosure.
Figure 4C:
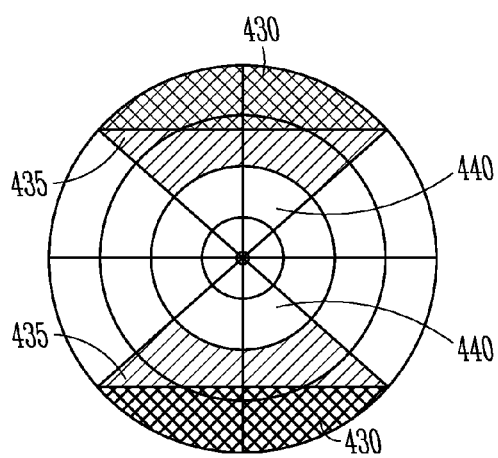
FIG. 4C is an illustration of the unit disk of FIG. 4B with full and partial occlusions.

FIG. 4A illustrates a full iris mapped to a unit circle localized with Guassian filters, FIG. 4B is an example embodiment of a unit disk that can be used in connection with an embodiment of the present disclosure, and FIG. 4C is an illustration of the unit disk of FIG. 4B with full and partial occlusions. FIGS. 4A, 4B, and 4C all involve the use of a unit circle. FIGS. 4A and 4B represent two methods of computing local iris regions, one using a Gaussian($\mu,\sigma$) and second approach by sector partitioning. FIG. 4A illustrates a full (i.e., no occlusions) iris mapped to a unit circle with Gaussian filters applied at a point (k, $\theta$). The term k ranges such that the Gaussian G($\mu$, $\sigma$) falls within the unit circle, and $\theta$ ranges from 0 to 360. The concentric circles 410 represent a Gaussian filter (function M(x,y) as described below) at (k, $\theta$). The term (k, $\theta$) is the center of the Gaussian at radius of k and an angle of $\theta$. FIG. 4B illustrates a unit disk, and a sector 420 that is a function of $R_1$, $R_2$, $\theta_1$, and $\theta_2$. FIG. 4C illustrates an actual iris mapped to a unit circle (with full and partial occlusions). The occluded regions 430 and the partially occluded regions 435 are not considered for the generation of feature vectors. That is, only the regions 440 (all the unshaded regions) are considered for localized Zernike moment calculations to form the iris feature vector.

Figure 3A:
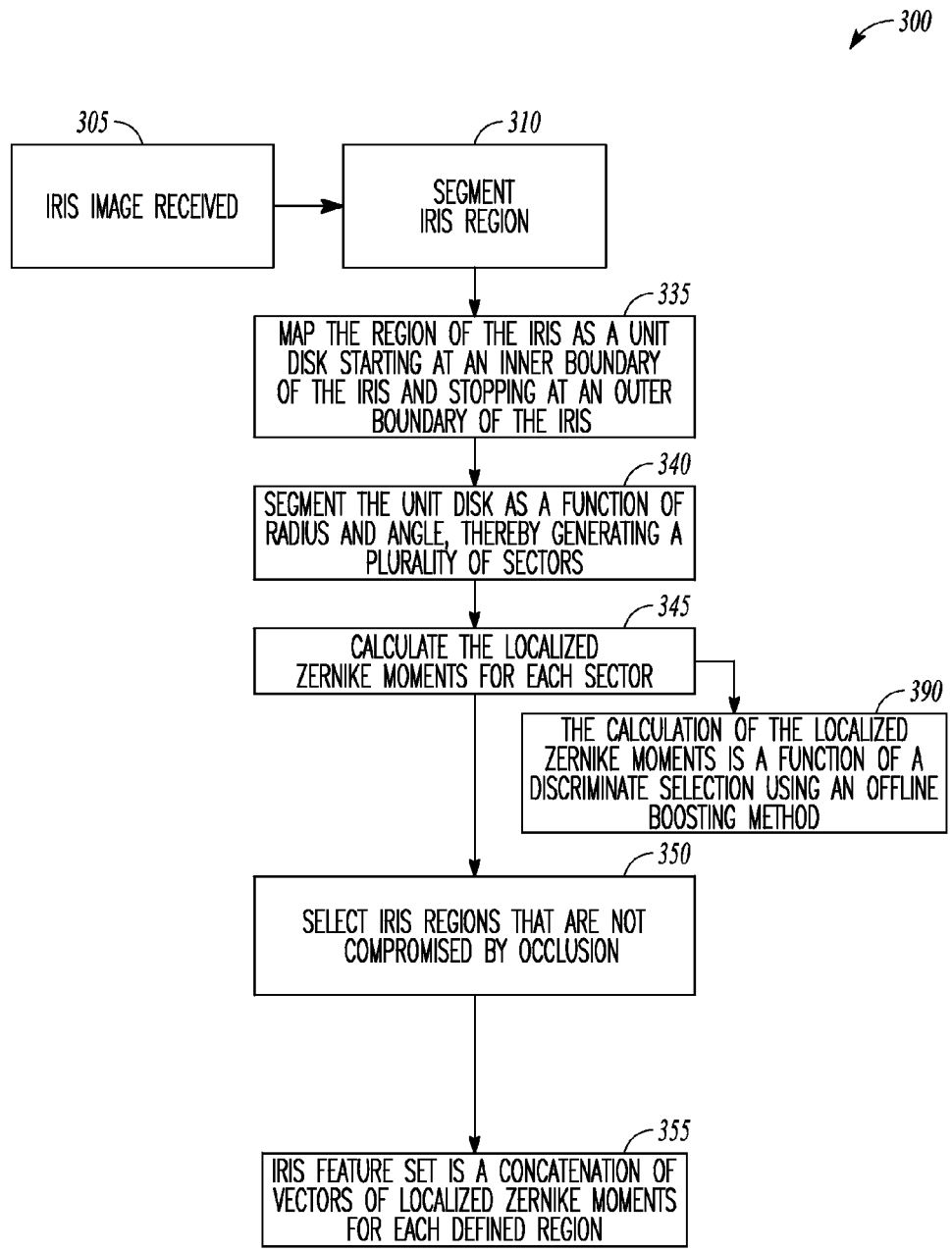
FIGS. 3A and 3B are a flow chart-like diagram illustrating the steps and features of an example embodiment of using localized Zernike moments for iris recognition.
Figure 3B:
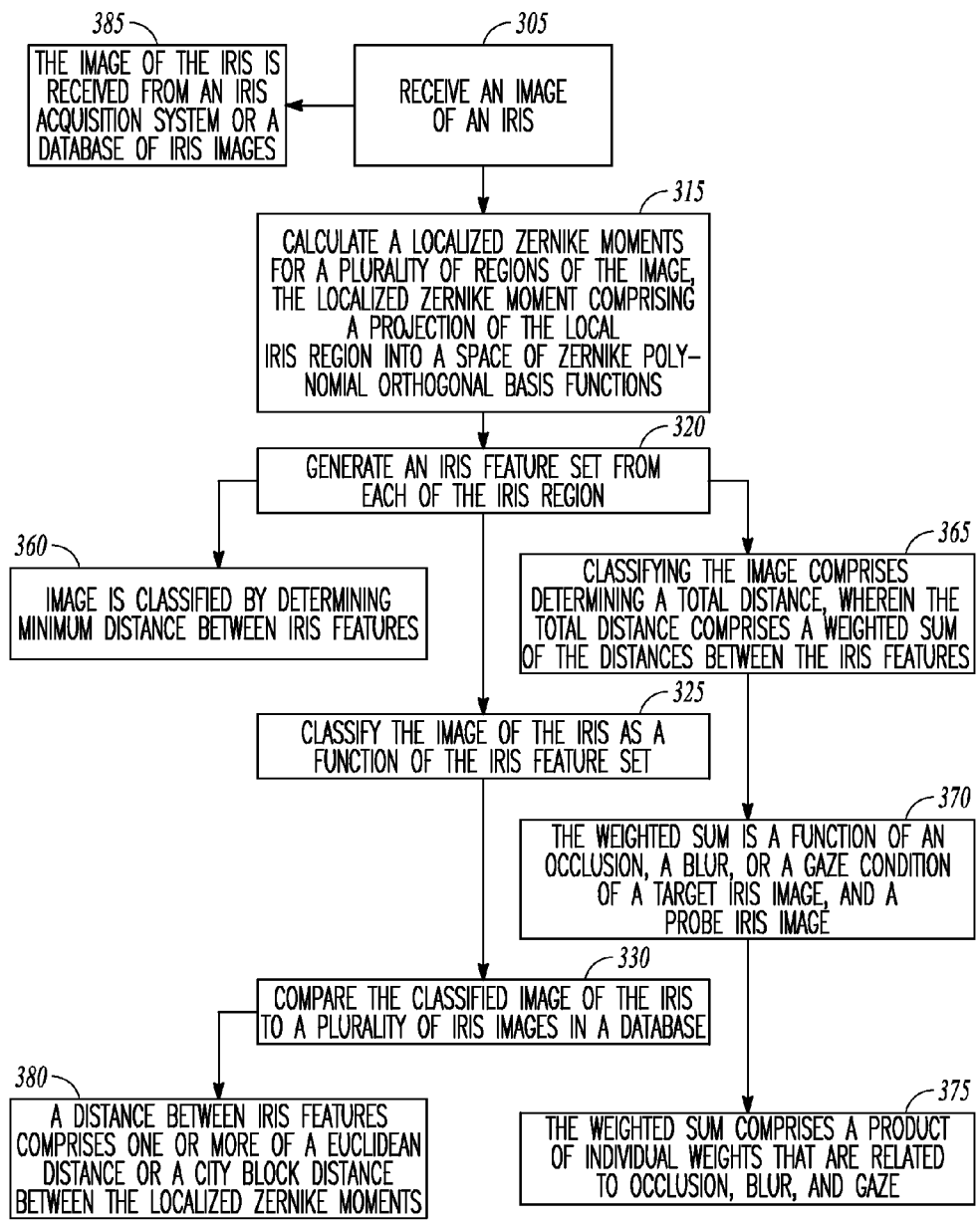

FIGS. 3A and 3B are flowchart-like diagrams of the features extraction and matching steps of an example embodiment of using localized Zernike moments in iris identification. FIGS. 3A and 3B include a number of process blocks 305-390. Though arranged serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 3A, at 305, an image of an iris is received into a computer processor. At 310, the image of the iris is segmented. This segmentation is illustrated in FIGS. 1 and 2. At 335, the image of the iris is mapped as a unit disk starting at an inner boundary of the iris and stopping at an outer boundary of the iris. This is as illustrated in FIG. 2. At 340, the unit disk is partitioned as a function of radius and angle, thereby generating a plurality of sectors. In specific, the local iris regions are a function of the radius of the iris and a first angle and second angle defining a sector of the local iris region as illustrated in FIG. 4B. The local iris regions can also be computed using a Gaussian as illustrated in FIG. 4A. At 345, localized Zernike moments are calculated for each local region. At 350, one or more localized regions that are compromised by occlusions are not selected for iris feature set. For example, in FIG. 4C, the Zernike moments computed for sector 430 and 435 would not be selected because sectors are occluded by the bottom portion of the eyelids. At 355, the iris feature set is a concatenation of vectors of localized Zernike moments for each defined region. And at 390, the calculation of the localized Zernike moments is a function of a discriminate selection using an offline boosting method for feature selection.

Referring to FIG. 3B, at 305, an image of an iris is received into a computer processor. At 315, localized Zernike moments are calculated for a plurality of segments of the image. The Zernike moments are defined as the projection of the input pattern into the space of orthogonal basis functions $V_{mn}(x,y) = V_{mn}(r, \theta) = R_{mn}(r)e^{in\theta}$ where $r = \sqrt{x^2+y^2}$ is the distance from the origin (0,0) to the point (x,y), $\theta$=arctan—is the angle formed by the x axis and r in anti clockwise, p, and q are order and repetition respectively with m≥0, |m|≥n, m−|n| is even, i=, and $R_{mn}(r)$ defined as, $$R_n^m(\rho) = \sum_{k=0}^{(n-m)/2} \frac{(-1)^k (n-k)!}{k!((n+m)/2-k)!((n-m)/2-k)!} \rho^{n-2k}. \quad (1)$$

The discretized Zernike's moments applied to a digital image are defined as $$Z_{mn} = \frac{(m+1)}{\Pi} \sum_y \sum_x R_{mn}(\sqrt{x^2+y^2}) e^{-i \cdot n \cdot \arctan(y/x)} f(x, y) \quad (2)$$

Where f(x,y) is the iris image.

The Pseudo-Zernike Moment set for the full unit circle (theta1, theta2)=(0, 2*$\pi$) and (r1, r2)=(0, 1) of order n and repetition l are defined as:

$$A_{nl} = \frac{n+1}{\pi} \int_0^{2\pi} \int_0^1 [V_{nl}(r\cos\theta, r\sin\theta)]^* f(r\cos\theta, r\sin\theta) r\, dr\, d\theta \quad (3)$$

where n=0, ... ∞ and l takes on positive and negative integer values subject to |l|≤n.

The localized Zernike moments include a projection of the masked iris region into a space of Zernike polynomial orthogonal basis functions, where the f(x, y) is replaced by f(x, y)*M(x, y) (dot product), where M(x, y) is defined as the mask for a sub-region of the iris image. M(x, y) as shown in FIG. 4N can be a region defined by (r1, r2, $\theta$1, $\theta$2) or as shown in FIG. 4A, can be a window centered at (k,$\theta$) where a Gaussian filter G($\mu$, $\sigma$) is applied. At 320, an iris feature set is generated from each of localized regions of the iris. The iris feature set is a vector formed by concatenating localized Zernike moments obtained for different orders of Zernike polynomials for each region defined by the values of r and $\theta$ in (3). A full iris feature set is defined as, $$Z_{iris} = [Z_{11}, Z_{12}, Z_{13} \ldots Z_{21}, Z_{22}, Z_{33}, \ldots Z_{PQ}] \quad (4)$$

where the sectors are discretized to P=[0→1] radii, and Q=[0→2$\pi$] angles. $Z_{pq}$ is the localized Zernike moment set $A_{n1}$ defined for f(x,y). $M_{pq}(x, y)$ for p=(1 ... P) and q=(1 ... Q). At 325, the image of the iris is represented as a function of the iris feature set, and at 330, the representative set of the iris is compared to a plurality of iris feature sets in a database.

At 360, the image is classified by determining a minimum distance between iris features. At 365, the image is classified by determining a total distance, wherein the total distance is a weighted sum of the distances between the iris features. The Zernike moments ($Z_{pq}$) for iris sectors which are not occluded in both the probe and target irises are only considered for iris feature distance value computation. At 370, the weighted sum is a function of an occlusion, a blur, or a gaze condition of one or more of a target iris image, a probe iris image, and a matching iris image. At 375, the weighted sum is a product of individual weights that are related to occlusion, blur, and gaze. The weights $W_{pq}$ for each sector is defined as $W_{pg} = O_{pg} * B_{pq} * G_{pq}$ where the occlusion, blur and gaze weights are determined and normalized for each sector. Thus Equation 4 would be modified as $$Z_{iris} = [Z_{11}*W_{11}, Z_{12}*W_{12} \ldots Z_{21}*W_{21}, \ldots Z_{PQ}*W_{PQ}] \quad (5)$$

At 380, a distance between iris features can be a Euclidean distance or a city block distance between the localized Zernike moments. City block distance between two vectors is defined as $$d_{ij} = \sum_{k=1}^{n} |x_{ik} - x_{jk}|.$$

At 385, the image of the iris is received from an iris acquisition system or a database of iris images.

Figure 5:
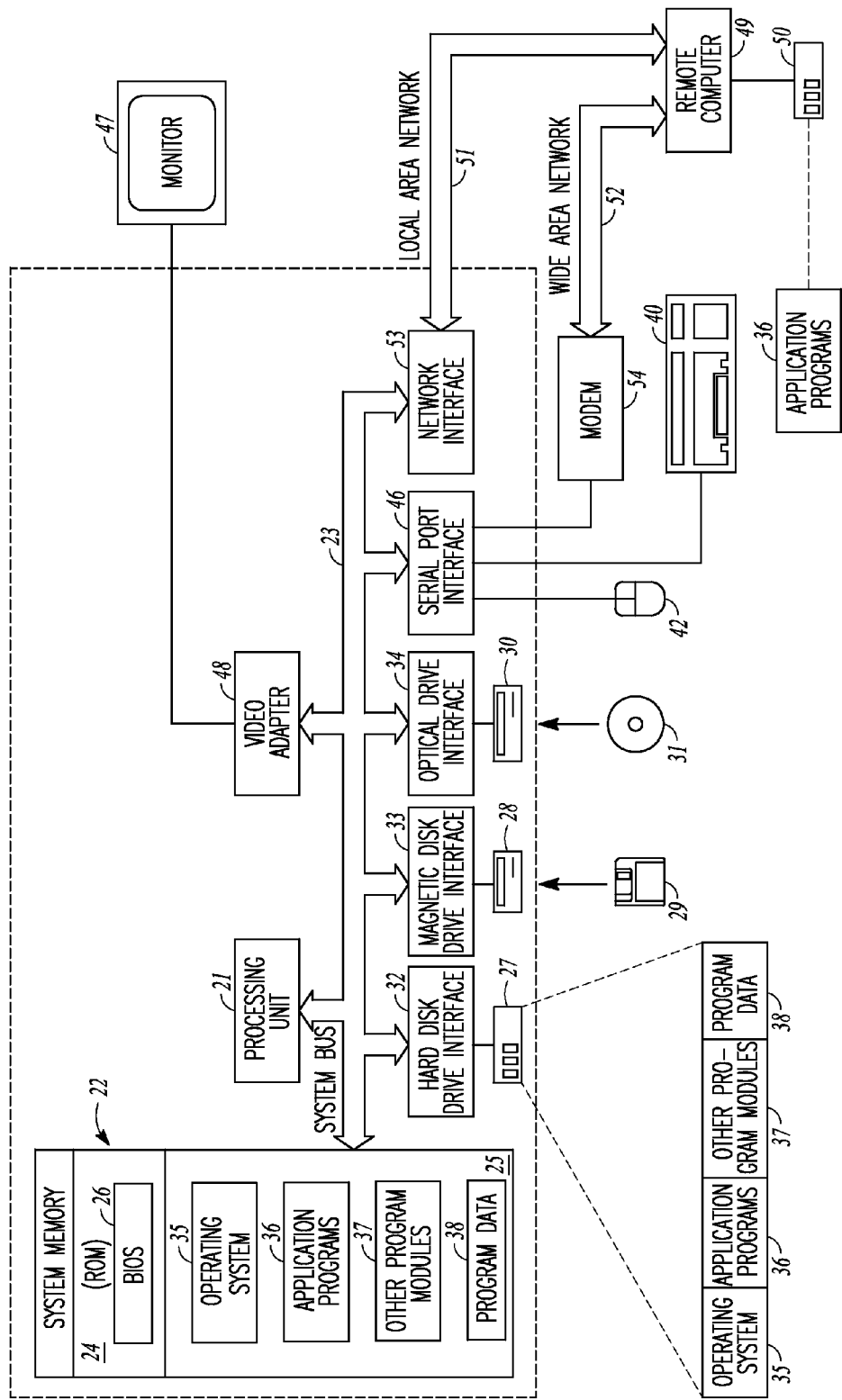
FIG. 5 is a block diagram of a computer system upon which one or more embodiments of the present disclosure can operate.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an Optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A system comprising:
    a computer processor and computer storage device configured to:
        receive an image of an iris;
        segment the image of the iris, thereby creating a local iris region;
        map the image of the iris as a unit disk starting at an inner boundary of the iris and stopping at an outer boundary of the iris;
        segment the unit disk as a function of a plurality of Gaussians centered at different locations in the local iris region, thereby generating a plurality of iris sub-regions;
        calculate a localized Zernike moment for each of the plurality of iris sub-regions to obtain a plurality of localized Zernike moments, each localized Zernike moment comprising a projection of the local iris region into a space of Zernike polynomial orthogonal basis functions;
        select the localized Zernike moments calculated for the iris sub-regions such that the iris sub-regions are not compromised by occlusion;
        generate a local iris texture feature set using the selected localized Zernike moments calculated for one or more iris sub-regions;
        classify the image of the iris as a function of the local iris texture feature set; and
        compare the classified image of the iris to a plurality of iris images in a database.

2. The system of claim 1, wherein the computer processor is configured to generate the local iris texture feature set from a vector of localized Zernike moments.

3. The system of claim 1, wherein the classifying of the image comprises determining a minimum distance between iris features.

4. The system of claim 1, wherein the classifying the image comprises determining a total distance, wherein the total distance comprises a weighted sum of the distances between the iris features.

5. The system of claim 4, wherein the weighted sum is a function of an occlusion, a blur, or a gaze condition of one or more of a target iris image, a probe iris image, and a matching iris image.

6. The system of claim 5, wherein the weighted sum comprises a product of individual weights that are related to occlusion, blur, and gaze.

7. The system of claim 1, wherein a distance between iris features comprises one or more of a Euclidean distance and a city block distance between the localized Zernike moments.

8. The system of claim 1, wherein the image of the iris is received from an iris acquisition system or a database of iris images.

9. The system of claim 1, wherein the calculation of the localized Zernike moments is a function of a discriminate selection using an offline boosting method.

10. A process comprising:
    receiving an image of an iris;
    segmenting the image of the iris, thereby creating a local iris region;
    mapping the image of the iris as a unit disk starting at an inner boundary of the iris and stopping at an outer boundary of the iris;
    segmenting the unit disk as a function of a plurality of Gaussians centered at different locations in the local iris region, thereby generating a plurality of iris sub-regions;
    calculating a localized Zernike moment for each iris sub-region to obtain a plurality of localized Zernike moments, each localized Zernike moment comprising a projection of the local iris region into a space of Zernike polynomial orthogonal basis functions;
    selecting the localized Zernike moments computed for the iris sub-regions such that the iris sub-regions are not compromised by occlusion;
    generating a local iris texture feature set using the selected Zernike moments;
    classifying the image of the iris as a function of the local iris texture feature set; and
    comparing the classified image of the iris to a plurality of iris images in a database.

11. The process of claim 10, comprising generating the local iris texture feature set from a vector of localized Zernike moments.

12. The process of claim 10, wherein the classifying of the image comprises determining a minimum distance between iris features.

13. The process of claim 10, wherein the classifying the image comprises determining a total distance, wherein the total distance comprises a weighted sum of the distances between the iris features.

14. The process of claim 13, wherein the weighted sum is a function of an occlusion, a blur, or a gaze condition of one or more of a target iris image, a probe iris image, and a matching iris image; and wherein the weighted sum comprises a product of individual weights that are related to occlusion, blur, and gaze.

15. The process of claim 10, wherein a distance between iris features comprises one or more of a Euclidean distance and a city block distance between the localized Zernike moments.

16. The process of claim 10, wherein the image of the iris is received from an iris acquisition system or a database of iris images.

17. A system comprising:
a computer processor and computer storage device configured to:
receive an image of an iris;
map the image of the iris as a unit disk starting at an inner boundary of the iris and stopping at an outer boundary of the iris;
segment the unit disk as a function of a plurality of Gaussians centered at different locations in an iris region, thereby generating a plurality of iris sub-regions;
calculate a localized Zernike moment for each iris sub-region to obtain a plurality of localized Zernike moments;
select the localized Zernike moments computed for the iris sub-regions such that the iris sub-regions are not compromised by occlusion; and
generate the local iris texture feature set using the selected Zernike moments computed over one or more iris sub-regions.

18. The system of claim 17, wherein the calculation of the localized Zernike moments is a function of a discriminate selection using an offline boosting method.

\* \* \* \* \*